(12) United States Patent  
Tsai et al.

(10) Patent No.: US 9,483,139 B2  
(45) Date of Patent: Nov. 1, 2016

(54) TOUCH DEVICE

(71) Applicants: Wen-Pao Tsai, Hsin-Chu (TW); Chin-Lung Chen, Hsin-Chu (TW)

(72) Inventors: Wen-Pao Tsai, Hsin-Chu (TW); Chin-Lung Chen, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 218 days.

(21) Appl. No.: 14/080,793

(22) Filed: Nov. 15, 2013

(65) Prior Publication Data

US 2014/0145865 A1 May 29, 2014

(30) Foreign Application Priority Data

Nov. 27, 2012 (TW) .............................. 101144347 A

(51) Int. Cl.  
*G06F 3/041* (2006.01)  
*G06F 3/044* (2006.01)

(52) U.S. Cl.  
CPC ............ *G06F 3/0416* (2013.01); *G06F 3/044* (2013.01)

(58) Field of Classification Search  
CPC ................ G06F 3/0416; G06F 3/041–3/045; G06F 2203/04104  
See application file for complete search history.

(56) References Cited

U.S. PATENT DOCUMENTS

| 2002/0089492 A1* | 7/2002 | Ahn ................... G02F 1/13338 345/173 |
| 2009/0033634 A1* | 2/2009 | Shih ..................... G06F 1/1626 345/173 |
| 2009/0284484 A1* | 11/2009 | Hwang ................. G06F 3/0416 345/173 |
| 2010/0182278 A1* | 7/2010 | Li .......................... G06F 3/0416 345/174 |
| 2010/0220072 A1* | 9/2010 | Chien ..................... G06F 3/041 345/173 |
| 2010/0328266 A1* | 12/2010 | Yamauchi ............ H03K 17/962 345/174 |
| 2011/0057898 A1* | 3/2011 | Huang .................... G06F 3/047 345/173 |
| 2011/0063246 A1* | 3/2011 | Wei ..................... H03K 17/9622 345/174 |

(Continued)

FOREIGN PATENT DOCUMENTS

| CN | 202422067 | 9/2012 |
| CN | 102750025 | 10/2012 |

(Continued)

OTHER PUBLICATIONS

Office Action of Taiwan Counterpart Application, issued on Sep. 24, 2014, p. 1-p. 14.

*Primary Examiner* — Hai Phan  
*Assistant Examiner* — Orlando Bousono  
(74) *Attorney, Agent, or Firm* — Jianq Chyun IP Office

(57) ABSTRACT

A touch device includes the following elements. A touch panel has two panel analog circuits and a panel digital circuit. Two inverting modules are assembled to two neighboring sides of the touch panel respectively, electrically coupled to the two panel analog circuits, and each electrically coupled to the panel digital circuit. A controlling module is assembled to the touch panel. The two inverting modules process analog signals transmitted from the two analog circuits into digital signals that are transmitted to the controlling module through the panel digital circuit. Therefore, the touch device may decrease a layout width that is occupied by the panel analog circuit.

18 Claims, 4 Drawing Sheets

(56) References Cited

U.S. PATENT DOCUMENTS

| | | | | |
|---|---|---|---|---|
| 2011/0115723 A1* | 5/2011 | Wang | ............... | G06F 3/045 345/173 |
| 2011/0115733 A1* | 5/2011 | Shih | ............... | G06F 3/044 345/173 |
| 2011/0315536 A1* | 12/2011 | Chiou | ............... | G06F 3/043 200/600 |
| 2012/0038560 A1 | 2/2012 | Mi | | |
| 2012/0146657 A1* | 6/2012 | Casillan | ............... | G06F 3/044 324/511 |
| 2012/0200506 A1* | 8/2012 | Taylor | ............... | H05K 1/189 345/173 |
| 2012/0249469 A1* | 10/2012 | Lin | ............... | G06F 3/041 345/174 |
| 2013/0176238 A1* | 7/2013 | Lo | ............... | G06F 3/044 345/173 |
| 2013/0265272 A1* | 10/2013 | Li | ............... | G06F 3/041 345/174 |

FOREIGN PATENT DOCUMENTS

| | | |
|---|---|---|
| TW | M381837 | 6/2010 |
| TW | 201029022 | 8/2010 |
| TW | M399340 | 3/2011 |
| TW | M400618 | 3/2011 |
| TW | M429928 | 5/2012 |
| TW | M434257 | 7/2012 |

* cited by examiner

TOUCH DEVICE

CROSS-REFERENCE TO RELATED APPLICATION

This application claims the priority benefit of Taiwan application serial no. 101144347, filed on Nov. 27, 2012. The entirety of the above-mentioned patent application is hereby incorporated by reference herein and made a part of this specification.

BACKGROUND OF THE INVENTION

1. Field of the Invention

The invention is related to a touch device, and more particularly to a touch device applied as an operating interface for a display of an electronic device.

2. Description of Related Art

In recent years, as information technology, wireless communication, and information appliances develop and are widely applied, the operation interfaces of many information products have changed from conventional keyboards and mice to touch panels applied in display panels. Common touch panels include resistive touch panels and capacitive touch panels. These types of touch panels have analog circuits formed around the edges of the touch panel, so as to transmit analog signals generated when a user contacts an electrode pattern.

Using a projected capacitive touch panel as an example, the projected capacitive touch panel adopts two layers of stacked electrode patterns. Two analog circuits respectively extend to an AD converter, so that the analog signals could be processed into digital signals. In order for the two layers of electrode patterns to respectively electrically couple by way of the two analog circuits from two different side edges of the touch panel to two AD converters disposed on a same side edge of the touch panel, one of the two analog circuits must extend from one side of the touch panel to the other adjacent side. Thus, more layout width is taken up, and the frame width of the product is increased. This disadvantage is especially apparent in a large dimension and high precision touch panel.

Taiwan Patent No. M381837 discloses a touch device with a control circuit and at least one electrode disposed on a same substrate. Taiwan Patent No. M429928 discloses a touch device. Taiwan Patent No. M400618 discloses a projected capacitive touch panel that could solve the problem of an X, Y axis driving line layout being too long, and could effectively expand dimensions. The structure of an X axis inverting module and the structure of a Y axis inverting module are respectively connected through a flat cable and a controlling module from a remote terminal.

SUMMARY OF THE INVENTION

The invention provides a touch device, advantageous in reducing a layout width of analog circuits on a touch panel.

Other objects and advantages of the invention can be further illustrated by the technical features broadly embodied and described as follows.

In order to achieve at least one of the above advantages or other advantages, an embodiment of the invention provides a touch device, including a touch panel, a first inverting module, a second inverting module, and a controlling module. The touch panel has a first electrode pattern, a second electrode pattern stacked on the first electrode pattern, a first panel analog circuit coupled to the first electrode pattern, a second panel analog circuit coupled to the second electrode pattern, and a panel digital circuit. The first inverting module is assembled on a side of the touch panel, and is electrically connected to first panel analog circuit and the panel digital circuit. The second inverting module is assembled on a adjacent side of the touch panel, and is electrically connected to second panel analog circuit and the panel digital circuit. The controlling module is assembled to the touch panel, and is electrically coupled to the panel digital circuit. The first inverting module and the second inverting module respectively process analog signals transmitted from the first panel analog circuit and the second panel analog circuit into digital signals. The digital signals are transmitted to the controlling module through the panel digital circuit.

In an embodiment of the invention, the first inverting module includes a first flexible board and a first inverter. The first flexible board is connected to an edge of the side of the touch panel. The first inverter is assembled on the first flexible board and is electrically coupled to the first panel analog circuit and the panel digital circuit through the first flexible board.

In an embodiment of the invention, the first flexible board includes a first flexible analog circuit and a first flexible digital circuit. The first panel analog circuit is electrically coupled to the first inverter through the first flexible analog circuit, and the first inverter is electrically coupled to the panel digital circuit through the first flexible digital circuit.

In an embodiment of the invention, the touch panel includes a panel power circuit. The first inverter is electrically coupled to the panel power circuit through the first flexible board.

In an embodiment of the invention, the first flexible board includes a first flexible power circuit. The panel power circuit is electrically coupled to the first inverter through the first flexible power circuit.

In an embodiment of the invention, the second inverting module includes a second flexible board and a second inverter. The second flexible board is connected to an edge of the adjacent side of the touch panel. The second inverter is assembled on the second flexible board and is electrically coupled to the second panel analog circuit and the panel digital circuit through the second flexible board.

In an embodiment of the invention, the second flexible board includes a second flexible analog circuit and a second flexible digital circuit. The second panel analog circuit is electrically coupled to the second inverter through the second flexible analog circuit, and the second inverter is electrically coupled to the panel digital circuit through the second flexible digital circuit.

In an embodiment of the invention, the touch panel includes a panel power circuit. The second inverter is electrically coupled to the panel power circuit through the second flexible board.

In an embodiment of the invention, the second flexible board includes a second flexible power circuit. The panel power circuit is electrically coupled to the second inverter through the second flexible power circuit.

In an embodiment of the invention, the controlling module includes a third flexible board, a rigid board, and a controller. The third flexible board is connected to an edge of the touch panel. The rigid board is connected to the third flexible board. The controller is assembled on the rigid board and is electrically coupled to the panel digital circuit through the rigid board and the third flexible board.

In an embodiment of the invention, the third flexible board includes a third flexible digital circuit. The panel digital circuit is electrically coupled to the rigid board through the third flexible digital circuit.

In an embodiment of the invention, the touch panel includes a panel power circuit, and the rigid board is electrically coupled to the panel power circuit through the third flexible board.

In an embodiment of the invention, the third flexible board includes a third flexible power circuit. The panel power circuit is electrically coupled to the rigid board through the third flexible power circuit.

In an embodiment of the invention, the controlling module includes a third flexible board and a controller. The third flexible board is connected to an edge of the touch panel. The controller is assembled on the third flexible board and is electrically coupled to the panel digital circuit through the third flexible board.

In an embodiment of the invention, the third flexible board includes a third flexible digital circuit. The panel digital circuit is electrically coupled to the controller through the third flexible digital circuit.

In an embodiment of the invention, the touch panel includes a panel power circuit, and the controller is electrically coupled to the panel power circuit through the third flexible board.

In an embodiment of the invention, the third flexible board includes a third flexible power circuit. The panel power circuit is electrically coupled to the controller through the third flexible power circuit.

In an embodiment of the invention, the touch panel includes a panel power circuit. The first inverting module is electrically coupled to the panel power circuit, the second inverting module is electrically coupled to the panel power circuit, and the controlling module is electrically coupled to the panel power circuit.

In an embodiment of the invention, the controlling module is assembled on the same side as the second inverting module on the touch panel Based on the above, the embodiment or embodiments of the invention may have at least one of the following advantages. In the embodiments of the invention, the two inverting modules are respectively assembled to two neighboring sides of the touch panel, so as to respectively process analog signals transmitted from the two panel analog circuits on neighboring sides of the touch panel into digital signals. The digital signals are transmitted to the controlling module through the panel digital circuit of the touch panel. This helps decrease the layout width of the panel analog circuits, which reduces the frame width of the product. This advantage is especially apparent in large dimension and high precision touch panels. In addition, the first inverting module and the second inverting module are electrically coupled to the panel power circuit, and the controlling module is electrically coupled to the panel power circuit. Thus, the controlling module could use the panel power circuit disposed on the touch panel to provide power to the first inverter and the second inverter. Therefore, an additional power source line for the controlling module to connect the first inverting module and the second inverting module could be omitted, reducing production cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
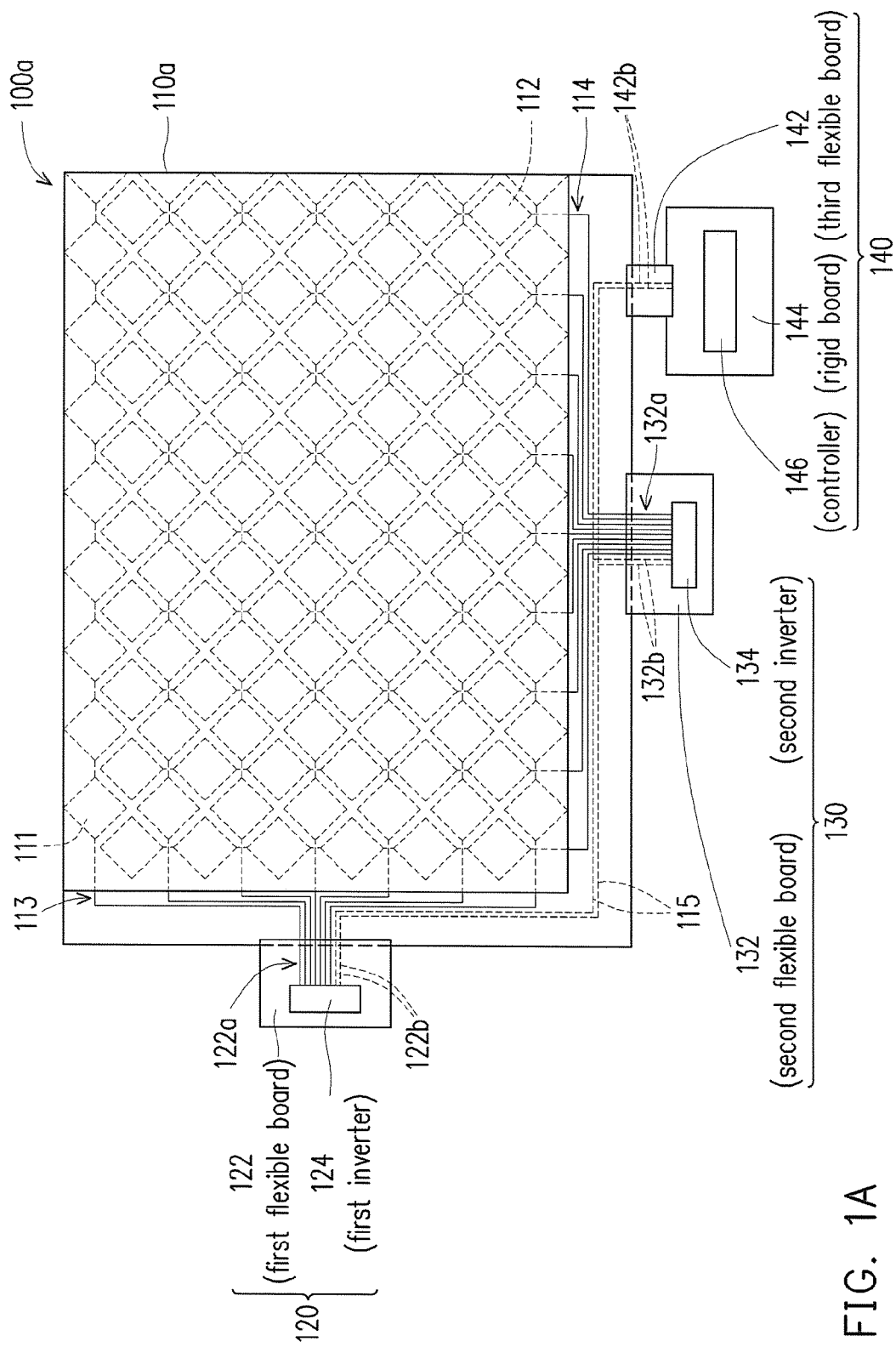
FIG. 1A is a front view of a touch device according to an embodiment of the invention.

FIG. 1A is a front view of a touch device according to an embodiment of the invention. The touch device 100a of the embodiment could be stacked on a display device (not shown) to be a Man-Machine Interface (MMI). The touch device 100a includes a touch panel 110a, a first inverting module 120, a second inverting module 130, and a controlling module 140.

The touch device 100a could be a capacitive type touch device, such as a projected capacitive touch panel, mainly of transparent material, such as glass. The touch panel 110a has a first electrode pattern 111, a second electrode pattern 112 stacked on the first electrode pattern 111, a first panel analog circuit 113 coupled to the first electrode pattern 111, a second panel analog circuit 114 coupled to the second electrode pattern 112, and a panel digital circuit 115. The first electrode pattern 111 and the second electrode pattern 112 convert the user's contact or approaching into analog signals. The analog signals are respectively transmitted by the first panel analog circuit 113 and the second panel analog circuit 114.

The first inverting module 120 is assembled on a side of the touch panel 110a, and is electrically connected to first panel analog circuit 113 and the panel digital circuit 115. The second inverting module 130 is assembled on the adjacent side of the touch panel 110a, and is electrically connected to second panel analog circuit 114 and the panel digital circuit 115. The controlling module 140 is assembled to the touch panel 110a, and is electrically coupled to the panel digital circuit 115. In this embodiment, the controlling module 140 is assembled on the same side as the second inverting module 130 on the touch panel 110a, while the invention is not limited thereto. The first inverting module 120 and the second inverting module 130 respectively process analog signals transmitted from the first panel analog circuit 113 and the second panel analog circuit 114 into digital signals. The digital signals are transmitted to the controlling module 140 through the panel digital circuit 115.

The first inverting module 120 includes a first flexible board 122 and a first inverter 124. The first flexible board 122 is connected to an edge of the side of the touch panel 110a. The first inverter 124 is assembled on the first flexible board 122, and is electrically coupled to the first panel analog circuit 113 and the panel digital circuit 115 through the first flexible board 122. Thus, after the first inverter 124 processes the analog signals transmitted from the first panel analog circuit 113 into digital signals, the digital signals could be transmitted to the panel digital circuit 115 through the first flexible board 122. In the embodiment, the first flexible board 122 includes a first flexible analog circuit 122a and a first flexible digital circuit 122b. The first panel analog circuit 113 is electrically coupled to the first inverter 124 through the first flexible analog circuit 122a, and the first inverter 124 is electrically coupled to the panel digital circuit 115 through the first flexible digital circuit 122b. The first inverter 124 could be an integrated circuit chip (IC chip), and could be assembled on the first flexible board 122.

The second inverting module 130 includes a second flexible board 132 and a second inverter 134. The second flexible board 132 is connected to an edge of the adjacent side of the touch panel 110a. The second inverter 134 is assembled on the second flexible board 132, and is electrically coupled to the second panel analog circuit 114 and the panel digital circuit 115 through the second flexible board 132. Thus, after the second inverter 134 processes the analog signals transmitted from the second panel analog circuit 114 into digital signals, the digital signals could be transmitted to the panel digital circuit 115 through the second flexible board 132. In the embodiment, the second flexible board 132 includes a second flexible analog circuit 132a and a second flexible digital circuit 132b. The second panel analog circuit 114 is electrically coupled to the second inverter 134 through the second flexible analog circuit 132a, and the second inverter 134 is electrically coupled to the panel digital circuit 115 through the second flexible digital circuit 132b. The second inverter 134 could be an IC chip, and could be assembled on the second flexible board 132.

The controlling module 140 includes a third flexible board 142, a rigid board 144, and a controller 146. The third flexible board 142 is connected to an edge of the touch panel 110a. The rigid board 144 is connected to the third flexible board 142. The controller 146 is assembled on the rigid board 144, and is electrically coupled to the panel digital circuit 115 through the rigid board 144 and the third flexible board 142. Thus, the third flexible board 142 could transmit the digital signals from the panel digital circuit 115 to the rigid board 144, and then transmit the digital signals to the controller 146 through the rigid board 144. In the embodiment, the third flexible board 142 includes a third flexible digital circuit 142b. The panel digital circuit 115 is electrically coupled to the rigid board 144 through the third flexible digital circuit 142b. The controller 146 could be an IC chip, and could be assembled on the rigid board 144.

The first inverter 124 and the second inverter 134 could use a chip-on-film process to be formed on the first flexible board 122 and the second flexible board 132. This way, besides reducing the signal lines from the first inverter 124 and the second inverter 134 to the controller 146, the overall mass of the touch device 100a could also be reduced, so as to achieve lightweight.

Figure 1B:
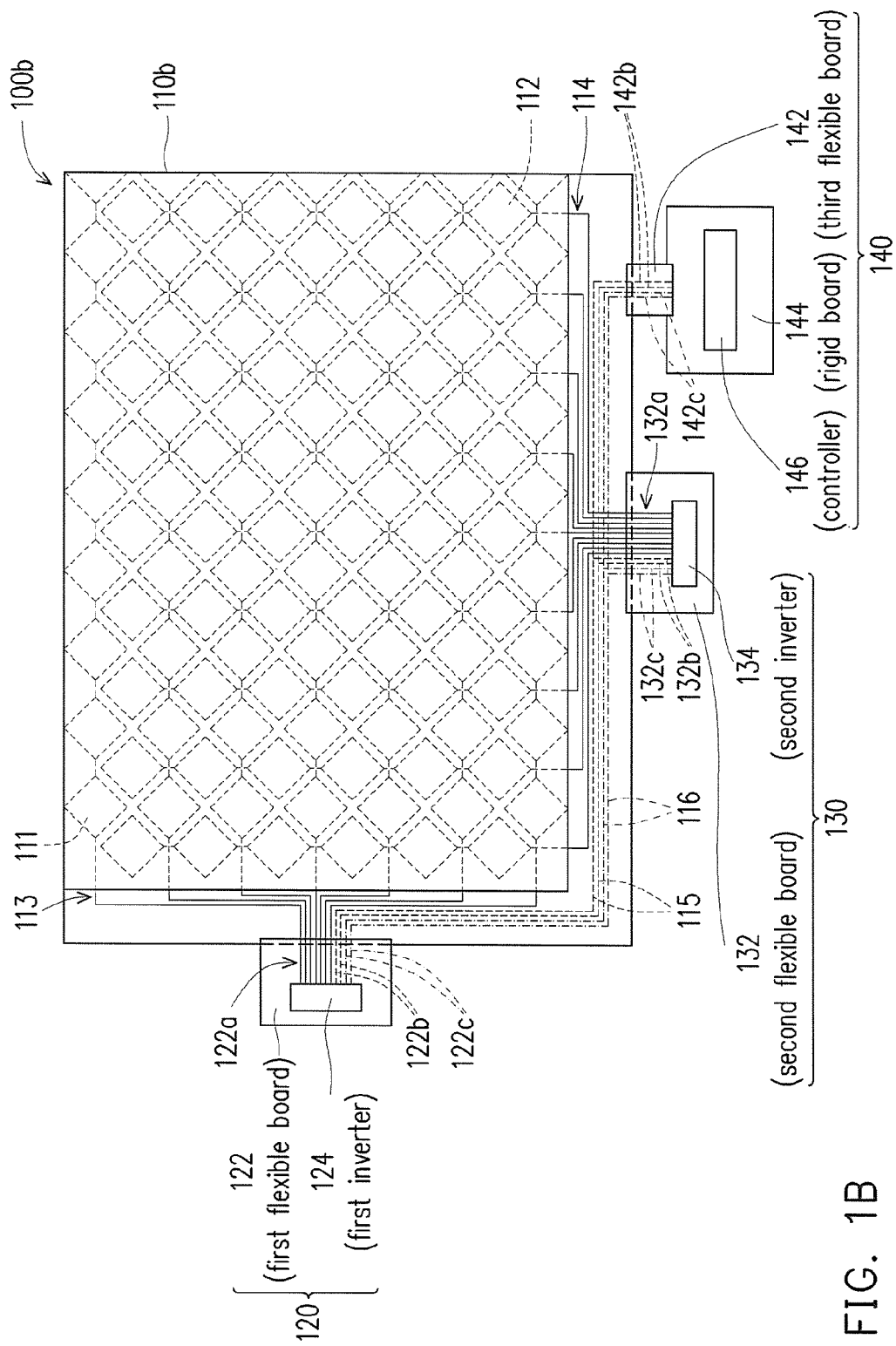
FIG. 1B is a front view of a touch device according to another embodiment of the invention.

FIG. 1B is a front view of a touch device according to another embodiment of the invention. The touch device 100b of the embodiment is similar to the structure and configuration of the touch device 100a of FIG. 1A. The difference between the structure of the touch device 100b and the touch device 100a of FIG. 1A is the touch panel 110b of the embodiment further has a first flexible power circuit 122c, a second flexible power circuit 132c, a third flexible power circuit 142c, and a panel power circuit 116 when compared to the touch panel 110a of FIG. 1A. The other similar structures and configurations will not be repeated herein. Please refer to FIG. 1B. The touch panel 110b could include the panel power circuit 116. The first inverting module 120, the second inverting module 130, and the controlling module 140 are each electrically coupled to the panel power circuit 116. In the embodiment, the first inverter 124 could be electrically coupled to the panel power circuit 116 through the first flexible board 122. The second inverter 134 could be electrically coupled to the panel power circuit 116 through the second flexible board 132. The rigid board 144 could be electrically coupled to the panel power circuit 116 through the third flexible board 142. Thus, power (not shown) could be provided to the panel power circuit 116 through the rigid board 144 and the third flexible board 142. Then, power could be respectively provided to the first inverter 124 and the second inverter 134 through the first flexible board 122 and the second flexible board 132.

In detail, in the embodiment, the first flexible board 122 includes the first flexible power circuit 122c. The panel power circuit 116 is electrically coupled to the first inverter 124 through the first flexible power circuit 122c. The second flexible board 132 includes a second flexible power circuit 132c. The panel power circuit 116 is electrically coupled to the second inverter 134 through the second flexible power circuit 132c. The third flexible board 142 includes a third flexible power circuit 142c. The panel power circuit 116 is electrically coupled to the rigid board 144 through the third flexible power circuit 142c.

In the embodiment, the first inverting module 120 and the second inverting module 130 are electrically coupled to the panel power circuit 116, and the controlling module 140 is electrically coupled to the panel power circuit 116. Thus, the controlling module 140 could use the panel power circuit 116 disposed on the touch panel 110b to provide power to the first inverter 124 and the second inverter 134. Therefore, an additional power source lines for the controlling module 140 to connect the first inverting module 120 and the second inverting module 130 could be omitted, reducing production cost.

Figure 1C:
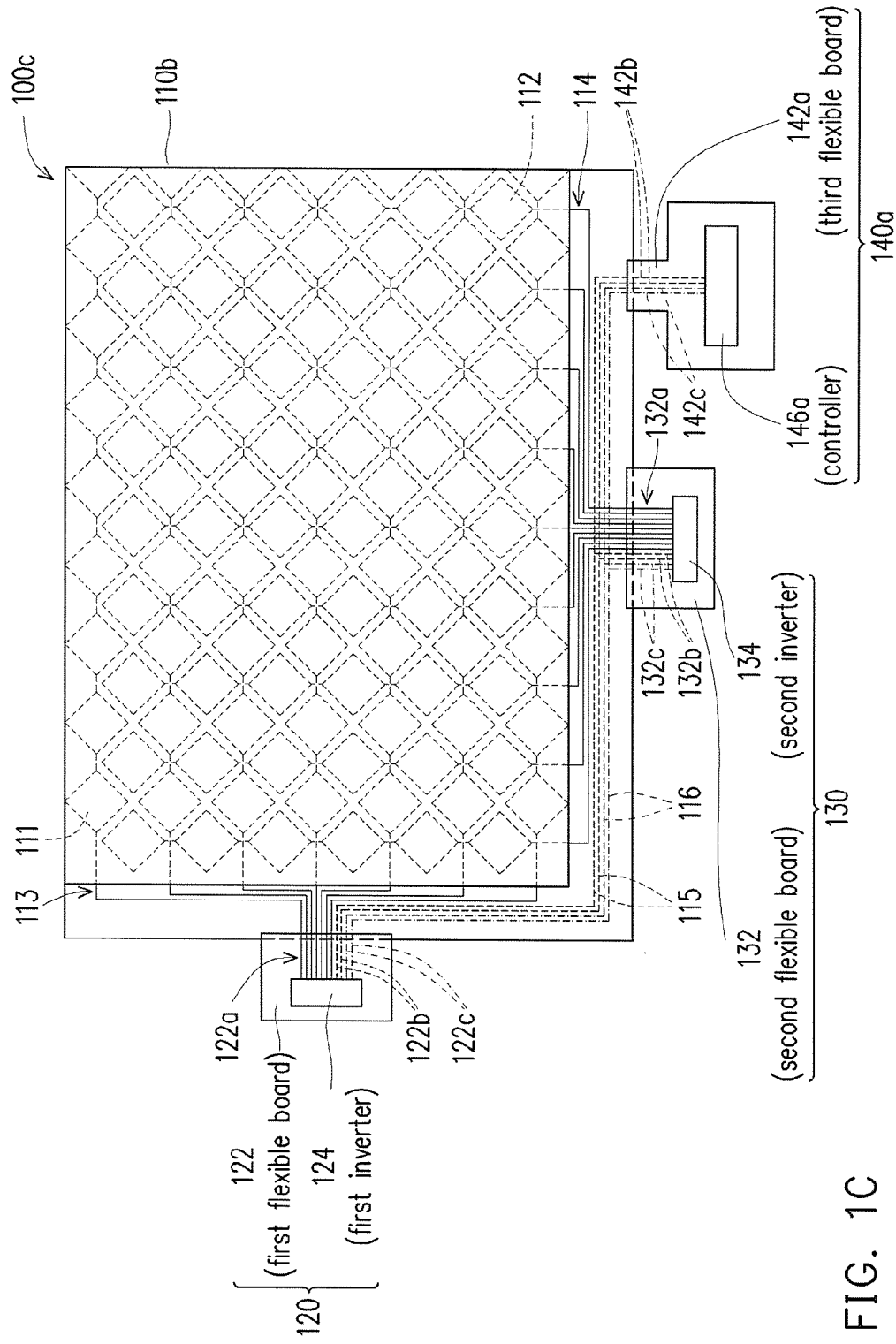
FIG. 1C is a front view of a touch device according to another embodiment of the invention.

FIG. 1C is a front view of a touch device according to another embodiment of the invention. The touch device 100c of the embodiment is similar to the structure and configuration of the touch device 100b of FIG. 1B. The difference between the structure of the touch device 100c and the touch device 100b of FIG. 1B is that in the touch device 100c, a controller 146a is directly disposed on a third flexible board 142a. Therefore, the rigid board 144 of the touch device 100b of FIG. 1B is omitted, further simplifying fabrication. Other similar structures and configurations are not repeated herein.

In the embodiment, the controlling module 140a includes the third flexible board 142a and the controller 146a. The controller 146a is assembled on the third flexible board 142a. The controller 146a is electrically coupled to the panel digital circuit 115 through the third flexible board 142a. Thus, the third flexible board 142a could transmit the digital signals from the panel digital circuit 115 to the controller 146a. In the embodiment, the third flexible board 142a includes a third flexible digital circuit 142b. The panel digital circuit 115 is electrically coupled to the controller 146a through the third flexible digital circuit 142b. In the embodiment, the touch panel 110b includes the panel power circuit 116. The controller 146a is electrically coupled to the panel power circuit 116 through the third flexible board 142a. In the embodiment, the third flexible board 142a includes a third flexible power circuit 142c. The panel power circuit 116 is electrically coupled to the controller 146a through the third flexible power circuit 142c.

Figure 2:
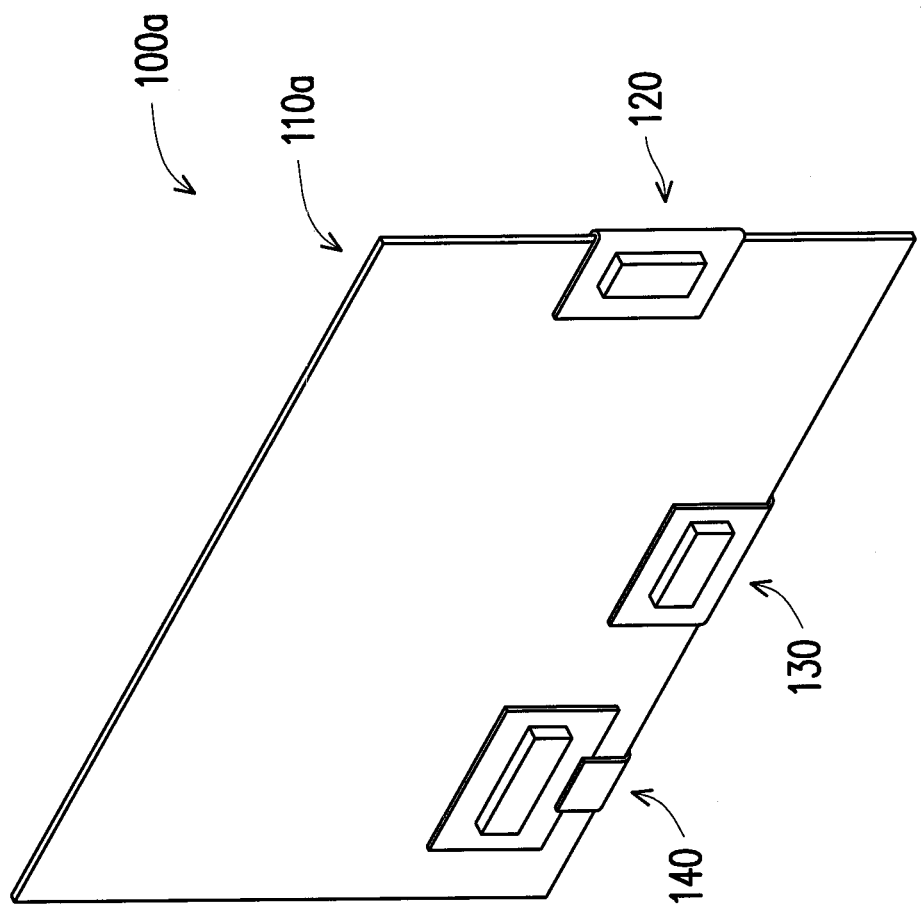
FIG. 2 is a rear three dimensional view of the touch device in FIG. 1A.

FIG. 2 is a rear three dimensional view of the touch device in FIG. 1A. Referring to FIG. 2, since the first flexible board 122 and the second flexible board 132 are flexible and could bend, the first inverter 124 and the second inverter 134 could be respectively disposed on the back side of the touch panel 110a through the first flexible board 122 and the second flexible board 132. Similarly, since the third flexible board 142 is flexible and could bend, the rigid board 144 and the controller 146 could be disposed on the back side of the touch panel 110a through the third flexible board 142.

In the above embodiments, the first flexible board, the second flexible board, and the third flexible board could be flexible circuit boards, such as flexible printed circuit boards (FPCB). The first inverter and the second inverter could be analog-to-digital converters (ADC). The rigid board could be a printed circuit board (PCB). However, the invention is not limited thereto.

To sum up, the embodiment or embodiments of the invention may have at least one of the following advantages: in the embodiments of the invention, the two inverting modules are respectively assembled to two neighboring sides of the touch panel, so as to respectively process analog signals transmitted from the two panel analog circuits on neighboring sides of the touch panel into digital signals. The digital signals are transmitted to the controlling module through the panel digital circuit of the touch panel. This helps decrease the layout width of the panel analog circuits, which reduces the frame width of the product. This advantage is especially apparent in large dimension and high precision touch panels. In addition, the first inverting module and the second inverting module are electrically coupled to the panel power circuit, and the controlling module is electrically coupled to the panel power circuit. Thus, the controlling module could use the panel power circuit disposed on the touch panel to provide power to the first inverter and the second inverter. Therefore, an additional power source line for the controlling module to connect the first inverting module and the second inverting module is omitted, reducing production cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch device, comprising:
   a touch panel, including a first electrode pattern, a second electrode pattern stacked on the first electrode pattern, a first panel analog circuit coupled to the first electrode pattern, a second panel analog circuit coupled to the second electrode pattern, and a panel digital circuit, wherein the panel digital circuit comprises a plurality of wires, and the wires are disposed on and integrated with the touch panel;
   a first inverting module comprising a first flexible board and a first inverter, the first inverting module assembled on a first side of the touch panel, and electrically connected to the first panel analog circuit and the wires of the panel digital circuit;
   a second inverting module comprising a second flexible board and a second inverter, the second inverting module assembled on a second side of the touch panel, and electrically connected to the second panel analog circuit and the wires of the panel digital circuit, wherein the second side of the touch panel is adjacent to the first side of the touch panel; and
   a main controller, assembled on the second side of the touch panel, and electrically coupled to the wires of the panel digital circuit, wherein the first inverting module and the second inverting module respectively process analog signals transmitted from the first panel analog circuit and the second panel analog circuit into digital signals, and the digital signals are transmitted to the main controller through the panel digital circuit.

2. The touch device as claimed in claim 1, wherein the first flexible board is connected to an edge of the first side of the touch panel, and the first inverter is assembled on the first flexible board and electrically coupled to the first panel analog circuit and the panel digital circuit through the first flexible board.

3. The touch device as claimed in claim 2, wherein the first flexible board comprises a first flexible analog circuit and a first flexible digital circuit, the first panel analog circuit is electrically coupled to the first inverter through the first flexible analog circuit, and the first inverter is electrically coupled to the panel digital circuit through the first flexible digital circuit.

4. The touch device as claimed in claim 2, wherein the touch panel comprises a panel power circuit, and the first inverter is electrically coupled to the panel power circuit through the first flexible board.

5. The touch device as claimed in claim 4, wherein the first flexible board comprises a first flexible power circuit, and the panel power circuit is electrically coupled to the first inverter through the first flexible power circuit.

6. The touch device as claimed in claim 1, wherein the second flexible board is connected to an edge of the second side of the touch panel, and the second inverter is assembled on the second flexible board and electrically coupled to the second panel analog circuit and the panel digital circuit through the second flexible board.

7. The touch device as claimed in claim 6, wherein the second flexible board comprises a second flexible analog circuit and a second flexible digital circuit, the second panel analog circuit is electrically coupled to the second inverter through the second flexible analog circuit, and the second inverter is electrically coupled to the panel digital circuit through the second flexible digital circuit.

8. The touch device as claimed in claim 6, wherein the touch panel comprises a panel power circuit, and the second inverter is electrically coupled to the panel power circuit through the second flexible board.

9. The touch device as claimed in claim 8, wherein the second flexible board comprises a second flexible power circuit, and the panel power circuit is electrically coupled to the second inverter through the second flexible power circuit.

10. The touch device as claimed in claim 1, wherein the main controller comprises:
a third flexible board, connected to an edge of the touch panel; and
a rigid board, connected to the third flexible board; and
a controller, assembled on the rigid board, and electrically coupled to the panel digital circuit through the rigid board and the third flexible board.

11. The touch device as claimed in claim 10, wherein the third flexible board comprises a third flexible digital circuit, and the panel digital circuit is electrically coupled to the rigid board through the third flexible digital circuit.

12. The touch device as claimed in claim 10, wherein the touch panel comprises a panel power circuit, and the rigid board is electrically coupled to the panel power circuit through the third flexible board.

13. The touch device as claimed in claim 12, wherein the third flexible board comprises a third flexible power circuit, and the panel power circuit is electrically coupled to the rigid board through the third flexible power circuit.

14. The touch device as claimed in claim 1, wherein the main controller comprises:
a third flexible board, connected to an edge of the touch panel; and
a controller, assembled on the third flexible board, and electrically coupled to the panel digital circuit through the third flexible board.

15. The touch device as claimed in claim 14, wherein the third flexible board comprises a third flexible digital circuit, and the panel digital circuit is electrically coupled to the controller through the third flexible digital circuit.

16. The touch device as claimed in claim 14, wherein the touch panel comprises a panel power circuit, and the controller is electrically coupled to the panel power circuit through the third flexible board.

17. The touch device as claimed in claim 16, wherein the third flexible board comprises a third flexible power circuit, and the panel power circuit is electrically coupled to the controller through the third flexible power circuit.

18. The touch device as claimed in claim 1, wherein the touch panel comprises a panel power circuit, the first inverting module is electrically coupled to the panel power circuit, the second inverting module is electrically coupled to the panel power circuit, and the main controller is electrically coupled to the panel power circuit.

* * * * *